(12) United States Patent
Lokhandwalla et al.

(10) Patent No.: US 8,581,464 B2
(45) Date of Patent: Nov. 12, 2013

(54) SEGMENTED ROTOR

(75) Inventors: Murtuza Lokhandwalla, Clifton Park, NY (US); Kiruba Sivasubramaniam Haran, Clifton Park, NY (US); Daniel Erno, Clifton Park, NY (US); Robert Zirin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 141 days.

(21) Appl. No.: 12/844,850

(22) Filed: Jul. 28, 2010

(65) Prior Publication Data

US 2011/0266909 A1    Nov. 3, 2011

(51) Int. Cl.
*H02K 1/28*    (2006.01)

(52) U.S. Cl.
USPC .................................. 310/156.12; 310/156.01

(58) Field of Classification Search
USPC ............... 310/156.12, 15.13, 153.14, 156.15; 290/44, 55
See application file for complete search history.

(56) References Cited

U.S. PATENT DOCUMENTS

| | | | | |
|---|---|---|---|---|
| 4,318,019 | A * | 3/1982 | Teasley et al. | 310/156.35 |
| 4,642,502 | A * | 2/1987 | Carpenter et al. | 310/156.12 |
| 6,417,578 | B1 * | 7/2002 | Chapman et al. | 290/44 |
| 6,965,186 | B2 * | 11/2005 | Fukuda et al. | 310/261.1 |
| 7,394,178 | B1 * | 7/2008 | Hsiung et al. | 310/156.12 |
| 7,679,260 | B2 * | 3/2010 | Yamamoto et al. | 310/268 |
| 2008/0265585 | A1 * | 10/2008 | Torres Martinez | 290/55 |
| 2008/0277942 | A1 * | 11/2008 | Torres Martinez | 290/55 |
| 2008/0296903 | A1 * | 12/2008 | Todorof | 290/55 |
| 2009/0134627 | A1 | 5/2009 | Stiesdal | |
| 2009/0134628 | A1 | 5/2009 | Stiesdal | |
| 2009/0134629 | A1 | 5/2009 | Stiesdal | |

OTHER PUBLICATIONS

M.R. Dubois, et al., Title: "Comparison of Generator Topologies for Direct-Drive Wind Turbines", pp. 1-5.
Siemens, Title: "Siemens Launches Permanent Magnet-Based Gearless Wind Turbine", Apr. 25, 2010, pp. 1-8.

* cited by examiner

*Primary Examiner* — Tran Nguyen
*Assistant Examiner* — Naishadh Desai
(74) *Attorney, Agent, or Firm* — Ann M. Agosti

(57) ABSTRACT

The present application provides a segmented rotor. The segmented rotor may include a center wheel, a number of rotor support segments positioned about the center wheel, and a number of active rotor components positioned about each of the rotor support segments.

14 Claims, 4 Drawing Sheets

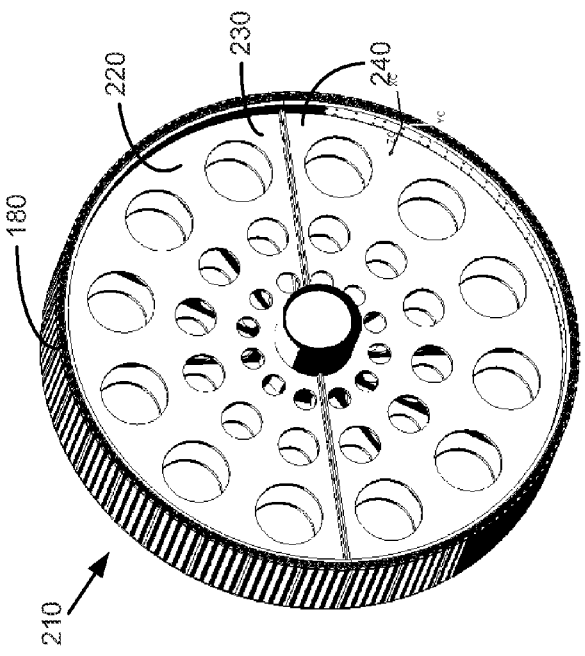
FIG. 7
FIG. 8
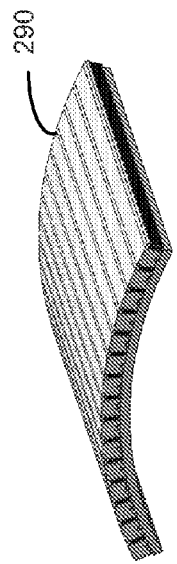
FIG. 11
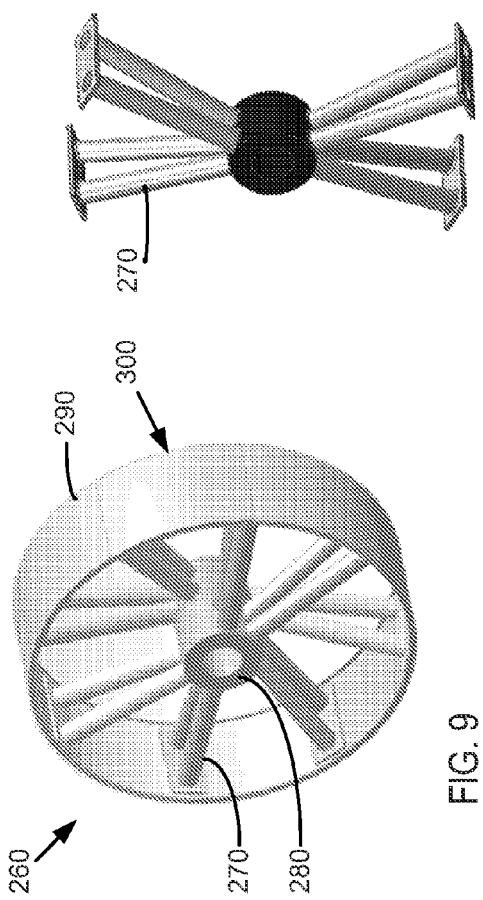
FIG. 10
FIG. 9

SEGMENTED ROTOR

TECHNICAL FIELD

The present application relates generally to a segmented rotor of an electrical machine and more particularly relates to a segmented rotor for use with large electrical generators such as in a wind turbine direct drive and the like so as to meet conventional ground shipping constraints while maintaining product reliability.

BACKGROUND OF THE INVENTION

Wind turbines have received increased public attention and interest because such turbines are environmentally safe and provide a relatively inexpensive alternative energy source with zero greenhouse gas ("GHG") emissions. Due to this growing interest, considerable efforts have been made to develop wind turbines that are reliable and efficient.

Generally described, wind turbines use the wind to generate electricity or to drive any type of load. The wind turns one or more blades connected to a hub and a shaft. The shaft may be in communication with a rotor of a generator. The spin of the blades, the shaft, and the rotor thus generates electricity. The wind turbine converts the kinetic energy of the wind into mechanical power and then the mechanical power drives the generator to produce electricity.

A rotor for a wind turbine generator having about a five (5) megawatt rating generally may have a diameter of more than about six (6) meters. Rotors of other types of utility grade wind turbines may be considerably larger. Typical intermodal shipping containers used for rail, ship, and/or truck transport, however, generally may be about four (4) meters in depth, about four (4) meters in height, and about fifteen (15) meters long. As such, these conventional intermodal shipping containers may not be used for the transport of most types of wind turbine rotors and the like. Rather, more expensive types of transport may be necessary.

There is therefore a desire for a segmented rotor that may be transported via conventional means while also being relatively easy to assemble on site. Moreover, the resulting rotor should have the desired strength and integrity as may be found with existing assemblies.

SUMMARY OF THE INVENTION

The present application thus provides a segmented rotor. The segmented rotor may include a center wheel, a number of rotor support segments positioned about the center wheel, and a number of active rotor components positioned about each of the rotor support segments.

The present application further provides a segmented rotor. The segmented rotor may include one or more hubs, a number of spider arms extending from the hubs, and a number of rotor segments attached to the spider arms and forming a rim thereabout.

The present application further provides for a segmented rotor. The segmented rotor may include a center wheel with a hub, a number of support arms extending therefrom, and a rim. A number of rotor support segments may be positioned about the rim of the center wheel. The rotor support segments may include a number of segment arms and a segment rim. A number of magnets may be positioned about the segments rims of the rotor support segments.

The present application further provides for a segmented rotor kit. The segmented rotor kit may include a center wheel, a number of rotor support segments, and a number of active rotor segments. The center wheel, the rotor support segments, and the active rotor segments each may have a size suitable for shipping, together or separately, within a container with about a four by four by fifteen meter configuration.

These and other features and improvements of the present application will become apparent to one of ordinary skill in the art upon review of the following detailed description when taken in conjunction with the several drawings and the appended claims.

BRIEF DESCRIPTION OF THE DRAWINGS

FIG. 7 is a perspective view of an alternative embodiment of a segmented rotor as may be described herein.

FIG. 8 is a plan view of a rotor half as may be used with the segmented rotor of FIG. 7.

FIG. 9 is a perspective view of an alternative embodiment of a segmented rotor as may be described herein.

FIG. 10 is a perspective view of a number of spider arms as may be used with the segmented rotor of FIG. 9.

FIG. 11 is a perspective view of a rotor segment as may be used with the segmented rotor of FIG. 9.

DETAILED DESCRIPTION

Figure 1:
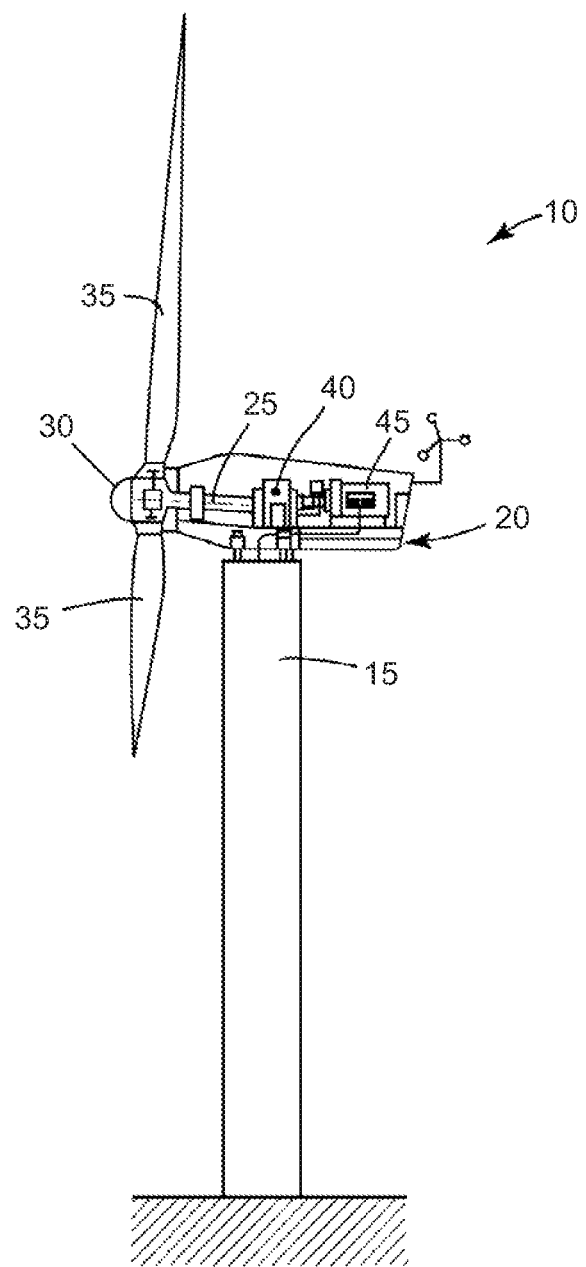
FIG. 1 is a schematic view of a known wind turbine.

Referring now to the drawings, in which like numerals refer to like elements throughout the several views, FIG. 1 shows a schematic view of one example of a known wind turbine 10. In this example, the wind turbine 10 may include a tower 15 supporting a nacelle 20. The nacelle 20 may support a drive train 25 that extends therethrough. One end of the drive train 25 supports a hub 30 with a number of blades 35 thereon. The other end of the drive train 25 may be in communication with a gearbox 40 and a wind turbine electrical generator 45. Examples of suitable wind turbines 10 may be available from General Electric Company of Schenectady, N.Y. Other configurations may be used herein.

Figure 2:
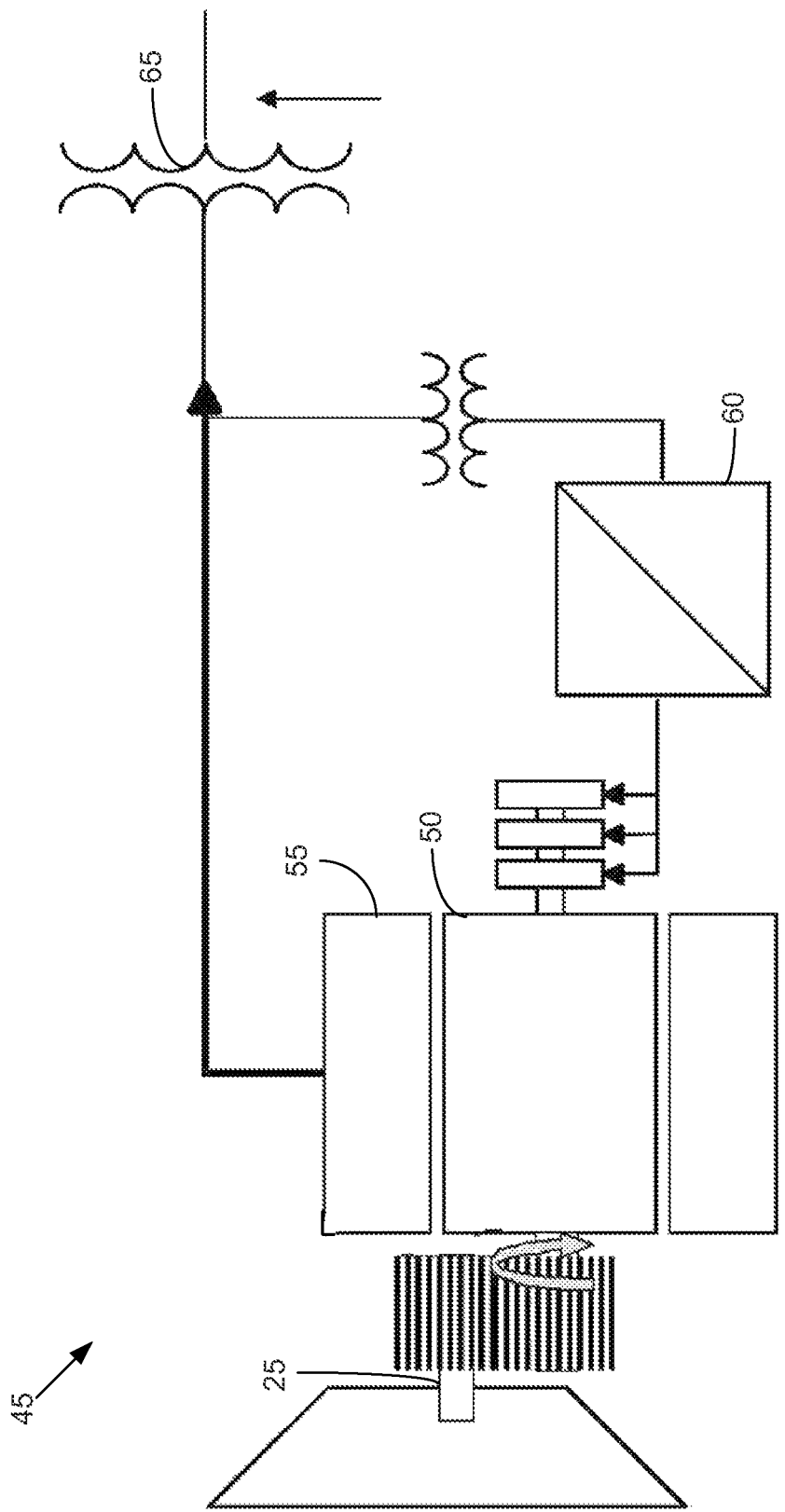
FIG. 2 is a schematic view of a known wind turbine generator.

FIG. 2 shows a schematic view of an example of the wind turbine electrical generator 45. The wind turbine electrical generator 45 may include a rotor 50 driven by the drive train 25 or otherwise so as to generate an electrical field with respect to a stator 55. Other components within the wind turbine electrical generator 45 may include a field converter 60 and a collector system 65. Other configurations and other types of components may be used herein.

FIGS. 3-6 show an example of a segmented rotor 100 as may be described herein for use with an electrical generator and the like. The segmented rotor 100 may include a center wheel 110. In this example, the center wheel 110 may be of unitary construction. The center wheel 110 may include a hub 120 and a number of support arms 130 extending from the hub 120 and leading to an outer rim 140. The hub 120 may connect to the drive train 25 or otherwise. The hub 120 may mate with the drive train 25 via ball bearings and the like. Any number and shape of the support arms 130 may be used herein. The center wheel 110 may have any desired size but preferably no larger than about four (4) meters in diameter so as to fit within a conventional intermodal shipping container and the like.

Figure 5:
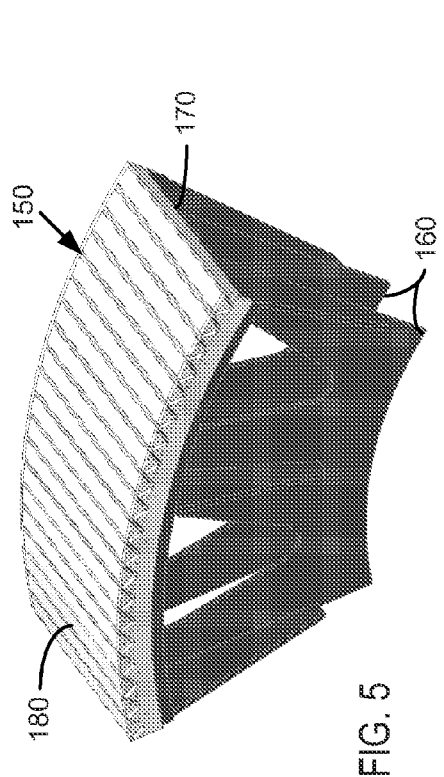
FIG. 5 is a perspective view of a rotor segment as may be used with the segmented rotor of FIG. 3.
Figure 4:
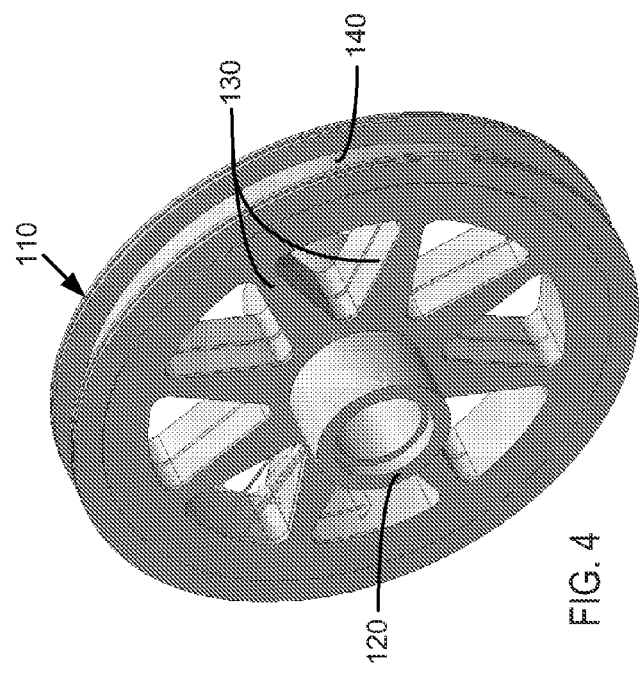
FIG. 4 is a perspective view of a wheel that may be used with the segmented rotor of FIG. 3.
Figure 3:
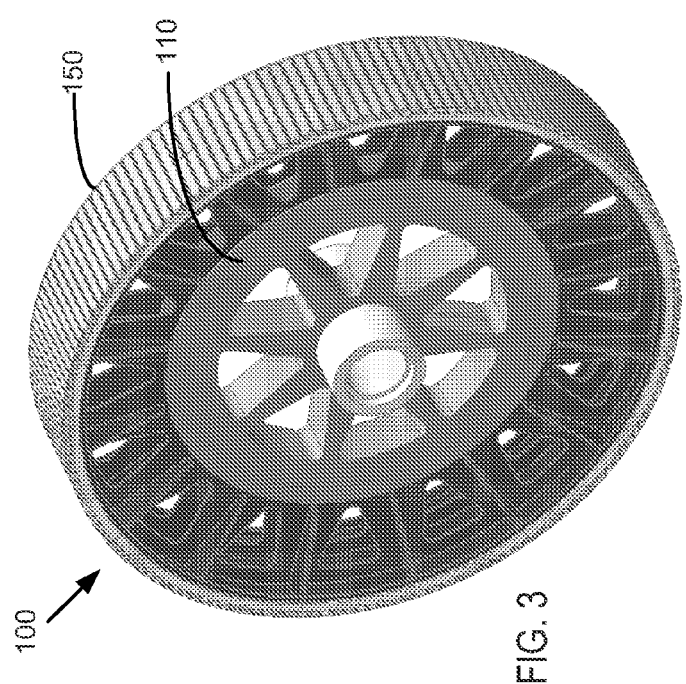
FIG. 3 is a perspective view of a segmented rotor as may be described herein.
Figure 6:
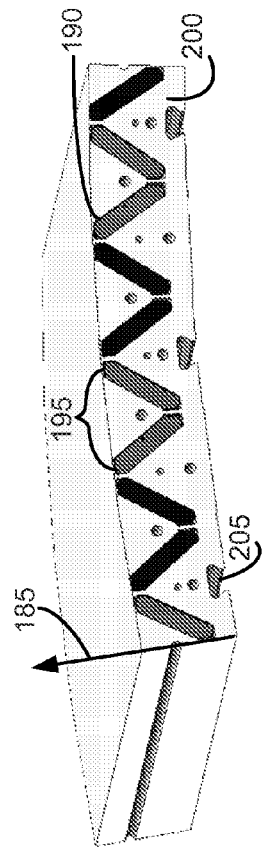
FIG. 6 is a partial side view of the rotor segment of FIG. 5.

FIG. 5 shows an individual rotor support segment 150 of the segmented rotor 100. Any number of the rotor support segments 150 may be positioned about the outer rim 140 of the center wheel 110. Although the rotor support segment 150 is shown as being one-eighth of the total diameter of the segmented rotor 100, any desired configuration and size of the individual rotor segments 150 may be used such as one-fourth, one-half, etc. Each rotor support segment 150 may be bolted or otherwise attached to the outer rim 140. Each rotor support segment 150 may have a number of segment arms 160 extending to a segment rim 170. Any number, shape, or size of the segment arms 160 may be used. Preferably, the rotor support segments 150 may be sized so as to fit within a conventional intermodal shipping container and the like.

A number of active rotor components or segments 180 may be positioned about the segment rim 170 or elsewhere. In the case of an embedded permanent magnet design, the active rotor segments 180 may include a number of permanent magnets 190 positioned about a number of laminations 200. The magnets 190 may be arranged in pairs with each pair having a pole 195. Each segment 180 may have a number of poles 195. Each segment 180 may be cut along an active axis 185 (D axis) so as to minimize any increase in magnetic resistance. Each pair of the segments 180 thus meet along the active axis 185.

The active rotor segments 180 may be attached to the segment rim 170 via conventional means such as a number of dovetails 205. Alternatively, slots, bars, direct bolting, or other types of attachment means may be used herein. Other types of active rotor segments or components 180 and/or other types of configurations also may be used herein.

FIGS. 7 and 8 show an alternative embodiment of a segmented rotor 210 as may be described herein. The segmented rotor 210 may be similar to the segmented rotor 100 described above but with a rotor 220 that may be split into a first part or half 230 and a second part or half 240 while using a center wheel in the form of a common hub 250. Other configurations and sizes also may be used. The active rotor segments 180 also may be used herein. The active rotor segments 180 may be attached to the common hub 250 via the dovetails 205, direct bolting, or other types of attachment means. The rotor support segments 150 and the hub 250 also may be sized to fit within a conventional intermodal shipping container and the like.

FIGS. 9-11 show a further embodiment of a segmented rotor 260 as may be described herein. The segmented rotor 260 may includes a number of spoke or spider arms 270 positioned on one or more hubs 280. Specifically, pairs of the spider arms 270 may be mounted on each hub 280. The hub or hubs 280 may be split. The spider arms 270 may take a substantially X-like shape. Likewise, the spider arms 270 also may take the form of solids structures such as the support arms 130 described above. Alternatively, a more solid cone-like shape may be used. Casting or other types of fabricating techniques may be used herein. In this example, two (2) hubs 280 with the spider arms 270 thereon are shown. Alternatively, a single hub 280 may be used.

Each of the spider arms 270 may extend to a rotor support segment 290 and may be attached thereto via bolting and the like. The combined rotor support segments 290 may form a completed rim 300. The hubs 280 may be split and axially displaced from the rotor support segments 290 such that the spider arms 270 may be inclined and circumferentially tilted. The spider arms 270 and the rotor support segments 290 may be individually factory balanced. The active rotor segments 180, as described above, may be positioned about the rotor support segments 290 via the dovetails 205, direct bolting, or otherwise. Other configurations may be used herein.

In use, the components of the segmented rotors 100, 210, 260 and the like may be sized so as to ship in a conventional intermodal shipping container and other types of conventional containers not requiring extraordinary attention and expense. Each element described herein may be shipped separately or together. Such a container may have about a four by four by fifteen meter configuration with a configuration of about 3.65 by 3.65 by 14.6 meters in specific. Any other size or configuration may be used herein.

The components of the segmented rotors 100, 210, 260 then may be assembled, aligned, and balanced on site. The components may be assembled via bolting, riveting, and the like. Other types of connection means may be used herein. The resultant rotor structure thus provides the desired strength and integrity of factory assembled components but with significantly easier shipping. Conventional shipping containers thus may be used at a significantly reduced cost and expense. Likewise, the components herein also may be shipped to locations otherwise inaccessible via nonconventional transport. As such, electrical generators for wind turbines and the like may be positioned in diverse locations.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A segmented rotor, comprising:
    a center wheel comprising an outer rim;
    a plurality of rotor support segments, each comprising rim segments, wherein the rotor support segments are positioned about and attached to the outer rim of the center wheel; and
    a plurality of active rotor segments positioned about and directly attached to the rim segments of the plurality of rotor support segments, wherein each of the plurality of active rotor segments comprises a plurality of permanent magnets and a plurality of poles.

2. The segmented rotor of claim 1, wherein the plurality of active rotor segments comprises a plurality of laminations.

3. The segmented rotor of claim 1, wherein adjacent ones of the plurality of active rotor segments meet along an active axis.

4. The segmented rotor of claim 1, wherein the center wheel comprises a hub and a plurality of support arms extending therefrom to the outer rim.

5. The segmented rotor of claim 1, wherein each of the plurality of rotor support segments comprises one or more segment arms extending to a respective rim segment.

6. The segmented rotor of claim 1, wherein the plurality of rotor support segments comprises eight (8) rotor segments.

7. The segmented rotor of claim 1, wherein the plurality of rotor support segments comprises four (4) rotor segments.

8. The segmented rotor of claim 1, wherein the plurality of rotor support segments comprises two (2) rotor segments.

9. A segmented rotor, comprising:
    a one or more hubs;
    a plurality of spoke arms extending from the one or more hubs;
    a plurality of rotor segments directly attached to the plurality of spoke arms and comprising a rim; and
    a plurality of active rotor segments positioned about and directly attached to the rim of the plurality of rotor segments, wherein the plurality of active rotor segments comprises a plurality of permanent magnets and a plurality of poles.

10. The segmented rotor of claim 9, wherein the plurality of active rotor segments comprises a plurality of laminations.

11. The segmented rotor of claim 9, wherein each pair of the plurality of active rotor segments meet along an active axis.

12. The segmented rotor of claim 9, wherein the one or more hubs comprise two hubs and wherein each hub comprises a plurality of substantially X-shaped spoke arms extending therefrom to said rim.

13. The segmented rotor of claim 9, wherein the one or more hubs comprise an axial displacement from the plurality of rotor segments.

14. The segmented rotor of claim 9, wherein the plurality of rotor segments comprises a circumferentially tilted position.

* * * * *